(12) United States Patent
Kim et al.

(10) Patent No.: US 8,187,764 B2
(45) Date of Patent: May 29, 2012

(54) FUEL CELL WITH MOISTURE RETENTIVE LAYER IN MEA

(75) Inventors: Ji-rae Kim, Seoul (KR); Hae-kyoung Kim, Seoul (KR); Seung-jae Lee, Seongnam-si (KR); Hyuk Chang, Seongnam-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1211 days.

(21) Appl. No.: 11/347,275

(22) Filed: Feb. 6, 2006

(65) Prior Publication Data

US 2006/0177726 A1 Aug. 10, 2006

(30) Foreign Application Priority Data

Feb. 4, 2005 (KR) .................. 10-2005-0010821

(51) Int. Cl.
*H01M 2/00* (2006.01)
*H01M 8/10* (2006.01)

(52) U.S. Cl. .................. 429/483; 429/529; 429/532

(58) Field of Classification Search .................. None
See application file for complete search history.

(56) References Cited

U.S. PATENT DOCUMENTS

| | | | | |
|---|---|---|---|---|
| 5,234,777 | A | * | 8/1993 | Wilson .................. 429/490 |
| 6,156,449 | A | * | 12/2000 | Zuber et al. .................. 429/480 |
| 6,291,091 | B1 | * | 9/2001 | Preischl et al. .................. 429/535 |
| 2002/0015875 | A1 | * | 2/2002 | Kim .................. 429/33 |
| 2003/0017379 | A1 | * | 1/2003 | Menashi .................. 429/44 |
| 2004/0166397 | A1 | | 8/2004 | Valdez et al. |
| 2004/0197629 | A1 | * | 10/2004 | Arishima et al. .................. 429/30 |
| 2004/0234839 | A1 | | 11/2004 | Wakizoe et al. |

FOREIGN PATENT DOCUMENTS

| | | | |
|---|---|---|---|
| CN | 1442913 | A | 9/2003 |
| CN | 1464580 | A | 12/2003 |
| JP | 6-52871 | | 2/1994 |
| JP | 6-111827 | | 4/1994 |
| JP | 06111827 | A * | 4/1994 |
| JP | 9-265996 | | 10/1997 |
| JP | 10-189004 | | 7/1998 |
| JP | 2001-345110 | | 12/2001 |
| JP | 2001345110 | A * | 12/2001 |
| JP | 2004-63409 | | 2/2004 |

(Continued)

OTHER PUBLICATIONS

Office Action issued by the Japanese Patent Office in Japanese Patent Application No. 2006-027441 on Aug. 4, 2009. Office action issued in Chinese Patent Application No. 2006100711333 on Aug. 24, 2007.

(Continued)

*Primary Examiner* — Keith Walker
(74) *Attorney, Agent, or Firm* — Christie, Parker & Hale, LLP

(57) ABSTRACT

A fuel cell includes a cathode, an anode, an electrolyte membrane interposed between the cathode and the anode, and a porous layer containing a moisture retentive material. The anode includes an anode catalyst layer adjacent to the electrolyte membrane and an anode diffusion layer adjacent to the anode catalyst layer, and the porous layer is disposed between the anode catalyst layer and the electrolyte membrane. The performance of the fuel cell can be stably maintained even when a fuel supply is temporarily interrupted due to a malfunction of a pump or clogging of a fuel channel.

4 Claims, 5 Drawing Sheets

FOREIGN PATENT DOCUMENTS

| | | |
|---|---|---|
| JP | 2004-158387 A | 6/2004 |
| JP | 2004-247091 | 9/2004 |
| JP | 2004-259661 | 9/2004 |
| WO | WO 03/023883 | 3/2003 |
| WO | WO 2004/063438 A1 | 7/2004 |

OTHER PUBLICATIONS

English translation of Japanese Office action issued by the Japanese Patent Office on Jul. 6, 2010 for corresponding Japanese Application No. 2006-027441, 3 pgs. (Office action previously submitted in an IDS Jul. 21, 2010).

* cited by examiner

FUEL CELL WITH MOISTURE RETENTIVE LAYER IN MEA

CROSS-REFERENCE TO RELATED APPLICATIONS

This application claims the benefit of Korean Patent Application No. 2005-10821, filed Feb. 4, 2005, in the Korean Intellectual Property Office, the disclosure of which is incorporated herein by reference.

BACKGROUND OF THE INVENTION

1. Field of the Invention

Aspects of the present invention relate to a fuel cell, and more particularly, to a fuel cell that includes a coated layer containing a moisture retentive material between an electrolyte membrane and an anode catalyst layer and/or between the anode catalyst layer and an anode diffusion layer, and thus can stably operate even when a fuel supply is temporarily interrupted.

2. Description of the Related Art

Fuel cells can be categorized into alkali fuel cells, phosphoric acid fuel cells, molten carbonate fuel cells, solid polymer electrolyte fuel cells, solid polymer fuel cells, and the like, according to the electrolytic solution that is used. Among these fuel cells, solid polymer electrolyte fuel cells that can operate at a low temperature, are easy to handle, and have a high output density have been drawing attention as energy sources for electric vehicles, home appliances, and the like.

A solid polymer electrolyte fuel cell includes a proton conductive layer as an electrolyte. The proton conductive layer must have a high ionic conductivity with respect to protons that are involved in an electrode reaction in the fuel cell. Such a proton conductive layer is typically formed of a super-strong acid-containing fluoride polymer. Such polymers are commonly known. For example, NAFION, a trademarked product of DuPont, is a fluoride polymer commonly used as a proton conductive layer. However, fluoride polymers tend to be very expensive and typically must always be humidified, since protons conduct through the medium of water.

U.S. Patent Publication No. 2004/0166397 discloses a direct methanol fuel cell with a membrane electrode assembly (MEA) manufactured by coupling a hydrophobic catalyst layer coated on a backing layer and a non-hydrophobic catalyst layer coated on a roughly treated electrolyte membrane, wherein a hydrophobic treatment is performed on a cathode.

Meanwhile, the performance of conventional fuel cells markedly degrades when a fuel supply is temporarily interrupted, as may happen, for example, when a pump malfunctions or a fuel channel becomes clogged.

SUMMARY OF THE INVENTION

Aspects of the present invention provide a fuel cell which can stably maintain the performance, such as a potential, even when a fuel supply is temporarily interrupted.

Additional aspects and/or advantages of the invention will be set forth in part in the description which follows and, in part, will be obvious from the description, or may be learned by practice of the invention.

According to an aspect of the present invention, there is provided a fuel cell comprising: a cathode; an anode; an electrolyte membrane interposed between the cathode and the anode, and a porous layer containing a moisture retentive material, wherein the anode comprises an anode catalyst layer adjacent to the electrolyte membrane and an anode diffusion layer adjacent to the anode catalyst layer, and wherein the porous layer is disposed between the anode catalyst layer and the electrolyte membrane.

The porous layer may further contain at least one of a catalyst and a proton conductive resin. For example, the porous layer may contain 100-1,000 parts by weight of a proton conductive resin and 2,000-3,000 parts by weight of a catalyst, based on 100 parts by weight of the moisture retentive material.

Alternatively, or additionally, a porous layer containing the moisture retentive material may be disposed between the anode catalyst layer and the anode diffusion layer.

The porous layer may be one of a continuously coated layer and a discontinuously coated layer. The thickness of the porous layer may be in the range of 0.5-5 µm.

The average particle diameter of the moisture retentive material may be in the range of $50\text{-}10^4$ nm.

According to another aspect of the present invention, there is provided a fuel cell comprising: a cathode; an anode; an electrolyte membrane interposed between the cathode and the anode, and a porous layer containing a moisture retentive material, wherein the anode comprises an anode catalyst layer adjacent to the electrolyte membrane and an anode diffusion layer adjacent to the anode catalyst layer, and the porous layer is disposed between the anode catalyst layer and the anode diffusion layer.

Alternatively or additionally, a porous layer containing the moisture retentive material may be disposed between the anode catalyst layer and the electrolyte membrane. The porous layer may further contain at least one of a catalyst and a proton conductive resin.

The porous layer may contain 100-1,000 parts by weight of a proton conductive resin and 2,000-3,000 parts by weight of a catalyst, based on 100 parts by weight of the moisture retentive material.

According to another aspect of the present invention, there is provided a fuel cell comprising: a cathode; an anode; an electrolyte membrane interposed between the cathode and the anode; and a porous layer containing a moisture retentive material, a catalyst, and a proton conductive resin, wherein the anode comprises an anode catalyst layer adjacent to the electrolyte membrane and an anode diffusion layer adjacent to the anode catalyst layer, and the porous layer is disposed between the anode catalyst layer and the electrolyte membrane.

According to another aspect of the present invention, there is provided a fuel cell comprising: a cathode; an anode; an electrolyte membrane interposed between the cathode and the anode; and a porous layer formed of silica ($SiO_2$), wherein the anode comprises an anode catalyst layer adjacent to the electrolyte membrane and an anode diffusion layer adjacent to the anode catalyst layer, and the porous layer is disposed between the anode catalyst layer and the electrolyte membrane.

According to another aspect of the present invention, there is provided a method of making a fuel cell comprising: providing an electrolyte membrane comprising a cation exchange polymer electrolyte; forming a porous layer of a moisture retentive material on at least a first side of the electrolyte membrane; and forming an anode catalyst layer on the first side of the electrolyte membrane and forming a cathode catalyst layer on a side opposite the first side, wherein the porous layer of moisture retentive material is between the anode catalyst layer and the electrolyte membrane.

According to another aspect of the present invention, there is provided a method of making a fuel cell comprising: providing an electrolyte membrane comprising a cation exchange polymer electrolyte; forming an anode catalyst layer and a porous layer of moisture retentive material on a first side of the electrolyte membrane and forming a cathode catalyst layer on a side opposite the first side; wherein the anode catalyst layer is between the porous layer of moisture retentive material and the electrolyte membrane; and forming an anode diffusion layer on the porous layer of moisture retentive material, wherein the porous layer of moisture retentive material is between the anode diffusion layer and the anode catalyst layer and forming a cathode diffusion layer on the cathode catalyst layer.

As described above, a fuel cell according to aspects of the present invention includes a porous layer between the electrolyte membrane and the anode catalyst layer and/or between the anode catalyst layer and the anode diffusion layer and thus can stably operate even when a fuel supply is temporarily interrupted.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
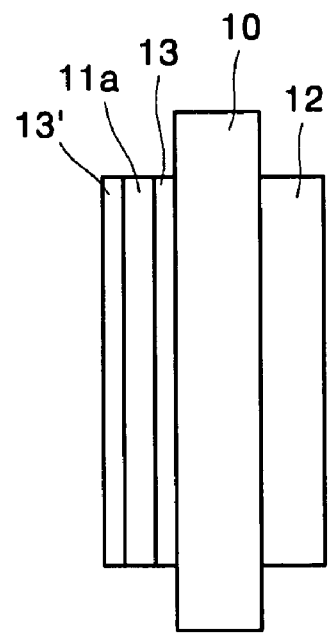
FIGS. 1A, 1B, and 1C illustrate the stacked structures of membrane electrode assemblies (MEAs) according to embodiments of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
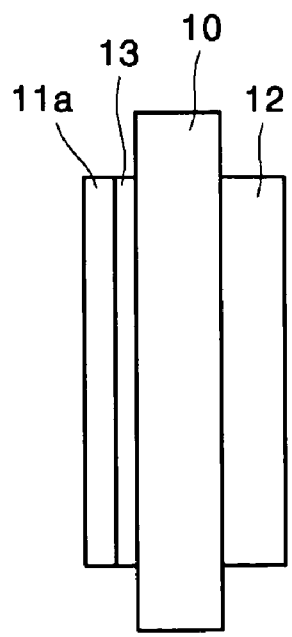
Figure 1C:
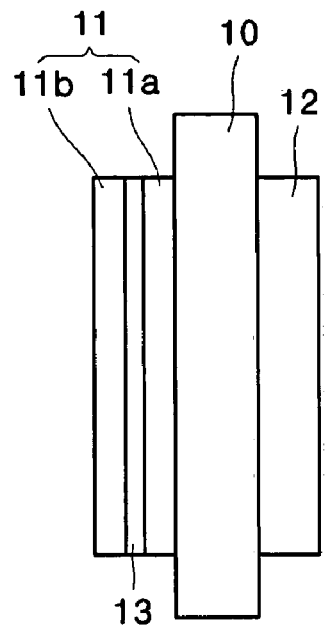

FIGS. 1A, 1B, and 1C illustrate the stacked structures of membrane electrode assemblies (MEAs) according to embodiments of the present invention.

Referring to FIG. 1A, an electrolyte membrane 10 is interposed between a catalyst layer 11a of an anode and a cathode 12. A porous layer 13 containing a moisture retentive material is interposed between the catalyst layer 11a of the anode and the electrolyte membrane 10. A porous layer 13' containing a moisture retentive material is formed on the other side of the catalyst layer 11a opposite to the porous layer 13. The anode includes a diffusion layer (not shown).

Referring to FIG. 1B, the electrolyte membrane 10 is interposed between the catalyst layer 11a of the anode and the cathode 12. The porous layer 13 containing a moisture retentive material is interposed between the catalyst layer 11a of the anode and the electrolyte membrane 10.

Referring to FIG. 1C, the electrolyte membrane 10 is interposed between the catalyst layer 11a of the anode and the cathode 12. The anode includes a diffusion layer 11b and the catalyst layer 11a. The porous layer 13 containing a moisture retentive material is interposed between the diffusion layer 11b and the catalyst layer 11a of the anode. Although not shown in FIG. 1C, another porous layer may be further formed between the electrolyte membrane 10 and the catalyst layer 11a of the anode.

In describing the positioning of layers of the fuel cell, the position of the electrolyte, anode catalyst layer, and anode diffusion layer may be described as they would be if no porous layer were present, and then the positioning of the porous layer relative to these layers is described. For example, where it is stated that the anode catalyst layer is adjacent to the electrolyte and that the porous layer is between the anode catalyst layer and the electrolyte, this means that the anode catalyst layer and the electrolyte would be adjacent to and in contact with each other if the porous layer were not present, and that the porous layer is between the two. Since in some embodiments, the porous layer is discontinuous, the anode catalyst layer and the electrolyte will contact each other in places where the porous layer is discontinuous. Likewise, where it is stated that the anode diffusion layer is adjacent to the anode catalyst layer and that the porous layer is between the anode diffusion layer and the anode catalyst layer, this means that the anode diffusion layer and the anode catalyst would be adjacent to and in contact with each other if the porous layer were not present, and that the porous layer is between the two. Since in some embodiments, the porous layer is discontinuous, the anode diffusion layer and the anode catalyst layer will contact each other in places where the porous layer is discontinuous.

In the fuel cells shown in FIGS. 1A and 1B, the porous layer 13 may contain, in addition to the moisture retentive material, at least one of a catalyst and a proton conductive resin (in other words, a catalyst, a proton conductive resin, or both). If present, the amount of the catalyst may be in the range of 2,000 to 3,000 parts by weight based on 100 parts by weight of the moisture retentive material. If present, the amount of the proton conductive resin may be in the range of 100 to 1,000 parts by weight based on 100 parts by weight of the moisture retentive material. When the amounts of the catalyst and the proton conductive region do not lie within the above ranges, the mobility of protons may deteriorate.

As non-limiting examples, the moisture retentive material may be at least one compound or composition selected from the group consisting of $SiO_2$, $TiO_2$, $ZrO_2$, mordenite, and zeolite. For example, the moisture retentive material may be $SiO_2$. As non-limiting examples, the catalyst may be Pt, Ru, Pd, Rh, Ir, Os, Pt, a mixture of these, an alloy of these, or a carrier catalyst in which the above-listed metals, or a mixture or an alloy thereof of these are dispersed in carbon black, active carbon, or graphite. For example, the catalyst may be a PtRu/C catalyst.

As non-limiting examples, the proton conductive resin may be NAFION, polytetrafluoroethylene, a tetrafluoroethylene-perfluoro alkylvinyl ether copolymer, or the like.

The thickness of the porous layer containing a moisture retentive material may be in the range of 0.5-5 μm. When the thickness of the porous layer is less than 0.5 μm, the porous layer is less able to bind to water so that the catalyst layer and the electrolyte membrane may easily become dried. When the thickness of the porous layer is greater than 5 μm, the porous layer may act as an insulating layer between the catalyst layer and the electrolyte membrane, thus increasing an interface resistance between the catalyst layer and the electrolyte membrane and deteriorating the performance of the cell.

The porous layer containing a moisture retentive material may be a continuously coated layer or a discontinuously coated layer. The term "continuously coated layer" denotes that the moisture retentive material contained in the porous layer is present as a continuous film. The term "discontinuously coated layer" denotes that the moisture retentive material contained in the porous layer is discontinuously present. In other words, the moisture retentive material may exist as islands throughout a porous layer. The moisture retentive material contained in the porous layer is preferably present as a discontinuously coated layer. When the porous layer is a discontinuously coated layer, it may have a high water-binding capacity that is sufficient to prevent the catalyst layer and the electrolyte membrane from drying. In addition, the discontinuously coated layer allows ions to easily migrate to the electrolyte membrane and allows $CO_2$ to be easily discharged.

A method of manufacturing a fuel cell having a stacked structure as shown in FIG. 1A according to an embodiment of the present invention will now be described in detail.

However, in the method of manufacturing a fuel cell in the present embodiment, the structure of the fuel cell is not limited to the stacked structure of FIG. 1A. In addition, although a decal process is used to form a cathode catalyst layer and an anode catalyst layer in the following description, a fuel cell according to the present invention can be manufactured using other processes, in addition to the decal process.

First, a composition for forming a catalyst layer is prepared by mixing a catalyst, a solvent, and a binder. The composition is coated onto a backing layer treated with a moisture retentive material, such as silica, and then dried, thus forming an anode catalyst layer.

The moisture retentive material used in the present invention may include at least one compound selected from $SiO_2$, $TiO_2$, $ZrO_2$, mordenite, and zeolite. For example, the moisture retentive material may be $SiO_2$. The average particle diameter of the moisture retentive material may be in the range of 3 nm to tens of μm, for example, $10^4$ nm, and is preferably 50-100 nm.

The backing layer treated with the moisture retentive material may be obtained, for example, by coating $SiO_2$ or $TiO_2$ onto a polymer film formed of polyethylene terephthalate (PET), KAPTONE (trademarked by Du Pont Co.), or the like, to a thickness of 0.5-5 μm. To obtain a discontinuous coating layer, a coated layer may be treated using a mask in a desired pattern to remove an unnecessary portion.

The binder may be a proton conductive resin, such as a water-repellent fluorine resin, preferably, having a melting point of 400° C. or less. Examples of such fluorine resins include NAFION, polytetrafluoroethylene, a tetrafluoroethylene-perfluoro alkylvinyl ether copolymer, or the like. The amount of the binder may be in the range of 10-15 parts by weight based on 100 parts by weight of the catalyst.

Examples of the catalyst include, but are not limited to, Pt, Ru, Pd, Rh, Ir, Os, Pt, a mixture or an alloy of these metals, or a carrier catalyst in which the forgoing metals, or a mixture or an alloy thereof, is dispersed in carbon black, active carbon, or graphite. For example, the catalyst may be a PtRu/C catalyst.

The solvent may be water, 1-propanol, ethyleneglycol, 2-propanol, or the like. The amount of the solvent may be in the range of 5 to 250 parts by weight based on 100 parts by weight of the catalyst. In particular, as non-limiting examples, when the solvent is water, the amount of the water may be in the range of 5 to 10 parts by weight based on 100 parts by weight of the catalyst. When the solvent is 1-propanol, the amount of the 1-propanol may be in the range of 150 to 250 parts by weight based on 100 parts by weight of the catalyst. When the solvent is ethylene glycol, the amount of the ethylene glycol may be in the range of 100 to 200 parts by weight based on 100 parts by weight of the catalyst. When the solvent is 2-propanol, the amount of the 2-propanol may be in the range of 150 to 250 parts by weight based on 100 parts by weight of the catalyst.

Separately, a composition for forming a cathode catalyst layer is prepared by mixing a catalyst, a solvent, and a binder. The kind and the amount of the binder and the solvent used for the composition for forming the cathode catalyst layer are the same as or similar to those used for the composition for forming the anode catalyst layer. The composition for forming the cathode catalyst layer is coated onto a backing layer, such as an $SiO_2$-coated PET film.

The electrolyte membrane may be formed of a cation exchange polymer electrolyte, such as a sulfonated perfluoropolymer (NAFION: available from DuPont Inc.) having a fluoride alkylene backbone and a sulfonic acid group-terminated fluoride vinyl ether side chain.

The electrolyte membrane is pre-processed such that $H^+$ forms of the same are obtained and then hot-pressed with the backing layer coated with the moisture retentive material, such as silica, to form a surface-coated layer containing the moisture retentive material on the electrolyte membrane. The surface-coated layer may be discontinuous or continuous coated layer. The hot-pressing may be performed at 70-100° C. at a pressure of 1 to 5 tons for 3-10 minutes. The hot-pressing time vary depending on the temperature and the pressure.

The amount of the moisture retentive material, such as silica, which is coated on the NAFION layer and the area of the coated portion vary according to the method of coating the material on the NAFION layer. For example, the amount of silica coated on the NAFION layer can be varied by continuously or discontinuously coating the silica on the NAFION layer.

The electrolyte membrane having a surface treated with the moisture retentive material, such as silica, the backing layer coated with the composition for forming the anode catalyst layer, and the backing layer coated with the composition for forming the cathode catalyst layer are hot-pressured to produce a catalyst coated membrane (CCM). The hot-pressing is performed at 80-130° C. at a pressure of 0.5 to 5 tons for 1 to 5 minutes to transfer the anode catalyst layer and the cathode catalyst layer from their backing layers, which are respectively coated with the anode catalyst forming composition and the cathode catalyst layer forming composition, to the electrolyte membrane, thereby resulting in a CCM.

Cathode and anode diffusion electrodes are formed by spraying ink, in which an emulsion containing a fluoride resin, such as polytetrafluoroethylene (PTFE), is uniformly dispersed in carbon black, onto a backing layer. The backing layer may be a carbon paper treated with PTFE.

The CCM is placed between the anode diffusion electrode and the cathode diffusion electrode and then hot-pressed together at 100-140° C. at a pressure of 0.1 to 5 tons, thus forming a membrane electrode assembly (MEA).

The present invention will be described in further detail with reference to the following examples. The following examples are for illustrative purposes only and are not intended to limit the scope of the present invention.

EXAMPLE 1

Manufacture of an MEA with $SiO_2$ Layers Between the Anode Catalyst Layer and the Anode Diffusion Layer and Between the Anode Catalyst Layer and the Electrolyte Membrane First, 0.5 g of deionized (DI) water was added to 1.2 g of PtRu black catalyst (available from Johnson Matthey Co.)

and then mixed such that the PtRu black catalyst was sufficiently wetted with DI water. 3 g of NAFION ionomer (available from DuPont Inc.) was added to the resulting solution, and then mixed. Then, 1.5 g of 1-propanol and 1.5 g of ethylene glycol (EG) were added thereto, and then dispersed using a stirrer to produce an anode catalyst slurry.

The anode catalyst slurry was coated onto a silica-treated backing layer using a doctor blade and dried in a vacuum at 80° C. to produce an anode catalyst layer. The silica-treated backing layer was a continuous layer having a thickness of 1 µm obtained by coating $SiO_2$ on a PET film.

Separately, for a cathode electrode, 0.1 g of DI water was added to 0.8 g of 60 wt % PtRu/C and mixed such that the 60 wt % PtRu/C was sufficiently wetted with DI water. Then, 6.4 g of NAFION ionomer and 2 g of ethylene glycol were added thereto and dispersed using a stirrer to produce a cathode catalyst slurry. The cathode catalyst slurry was coated onto a PET backing layer, which was not treated with silica, using a doctor blade and then dried in a vacuum at 80° C. to produce a cathode catalyst layer.

For an electrolyte membrane, first, a NAFION membrane 115 (available from DuPont, Inc.) was washed with 5 wt % $H_2O_2$ at 80° C. to remove impurities and then treated with a 1M $H_2SO_4$ solution at 80° C. to obtain the $H^+$ form of the electrolyte membrane. The resulting NAFION membrane and a silica-treated backing layer were hot-pressed together at a pressure of 1 ton at 85° C. for 1 minute to produce a silica-coated NAFION membrane.

The silica-coated NAFION membrane, the anode catalyst slurry-coated backing layer and the cathode catalyst slurry-coated backing layer were hot-pressed to produce a catalyst coated membrane (CCM). The hot-pressing was performed at 85° C. at a pressure of 3 tons for 5 minutes such that catalyst layers were respectively transferred from the anode catalyst slurry-coated backing layer and from the cathode catalyst slurry-coated backing layer to the electrolyte membrane to produce the CCM.

A cathode diffusion electrode and an anode diffusion electrode were manufactured by spraying ink, which was prepared by uniformly dispersing a PTFE emulsion in carbon black, onto a backing layer. A PTFE-treated carbon paper was used as the backing layer onto which the ink was sprayed. The amounts of PTFE used for the anode diffusion electrode and the cathode diffusion electrode were 10 wt % and 20 wt %, respectively.

The CCM was placed between the anode diffusion electrode and the cathode diffusion electrode and then hot-pressed together at 125° C. at a pressure of 1 ton for 5 minutes to produce a MEA for a fuel cell.

EXAMPLE 2

Manufacture of an MEA with a $SiO_2$ Layer Between the Anode Catalyst Layer and the Anode Diffusion Layer An MEA for a fuel cell was manufactured in the same manner as in Example 1, except that the NAFION layer was not coated with silica.

EXAMPLE 3

Manufacture of an MEA with a $SiO_2$ Layer Between the Anode Catalyst Layer and the Electrolyte Membrane An MEA for a fuel cell was manufactured in the same manner as in Example 1, except that the anode catalyst slurry was coated using a doctor blade onto a backing layer that was not treated with silica.

EXAMPLE 4

An MEA for a fuel cell was manufactured in the same manner as in Example 1, except that 5 parts by weight of $SiO_2$ based on 100 parts by weight of the catalyst was added to the anode catalyst slurry of Example 1 and the resulting slurry was coated using a doctor blade onto a backing layer that was not treated with silica.

For an electrolyte membrane, a NAFION membrane 115 (available from DuPont Inc.) was washed with 5 wt % $H_2O_2$ at 80° C. to remove impurities and then treated with a 1M $H_2SO_4$ solution at 80° C. to obtain the $H^+$ form of the electrolyte membrane.

In Examples 1 through 4, above, the average particle diameter of silica as the moisture retentive material was about 0.5 µm.

COMPARATIVE EXAMPLE 1

An MEA for a fuel cell was manufactured in the same manner as in Example 1, except that the backing layers used to manufacture the anode catalyst layer and cathode catalyst layer were not treated with silica, and a NAFION layer not treated with silica was used as the electrolyte membrane.

The performances of the MEAs according to Example 1 and Comparative Example 1 were measured under the same conditions. The results are shown in FIGS. 2, 3A through 3D, 4A, and 4B.

For the measurements, 2M methanol was provided to the anodes, and air was provided to the cathodes at room temperature. Then, when all of the MEAs were activated for 30 minutes, the supply of methanol was stopped, and changes in performance were measured.

Figure 2:
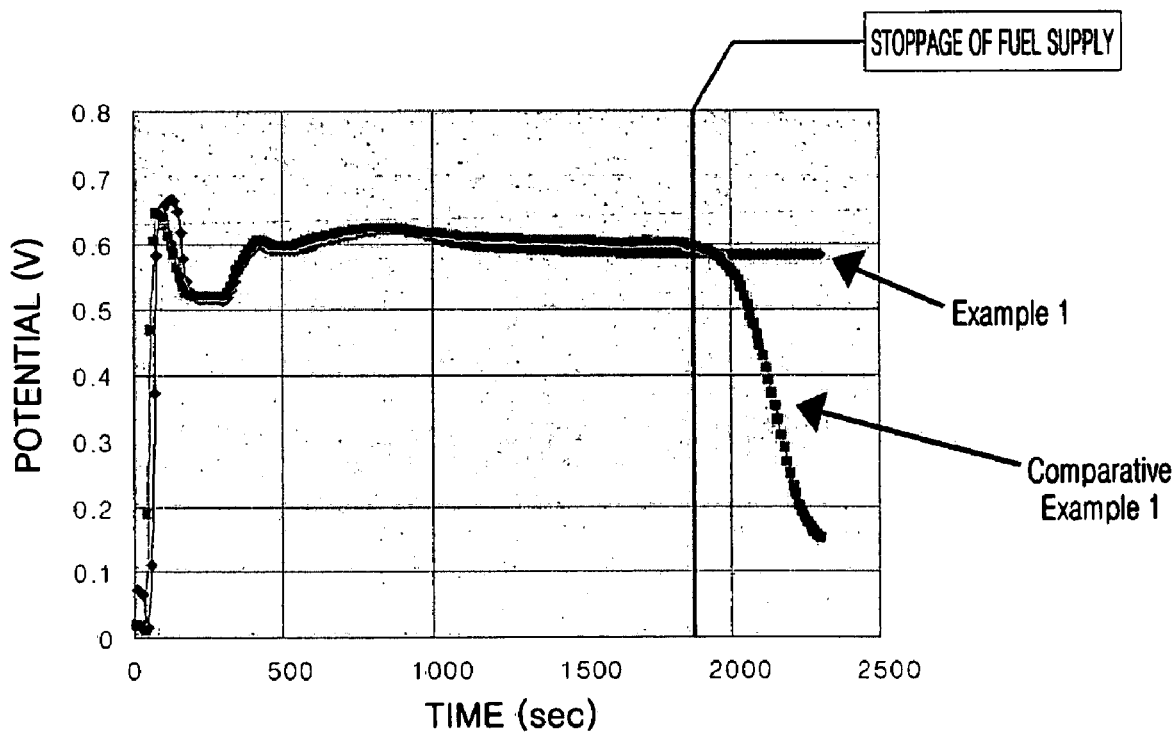
FIG. 2 is a graph of potential with respect to time of MEAs according to Example 1 and Comparative Example 1.

Referring to FIG. 2, the performance of the MEA according to Comparative Example 1 gradually decreased to half or less of the initial performance after 3 minutes from when the supply of the fuel had stopped. However, the performances of the MEAs according to Examples 1 and 2, which had an additional silica layer, remained constant for about 10 minutes after the supply of the fuel had stopped. Accordingly, it was confirmed that if a supply of fuel is stopped for a short period, due to a malfunction of a pump or clogging of a fuel channel, for example, a fuel cell according to the present invention can stably operate.

Figure 3A:
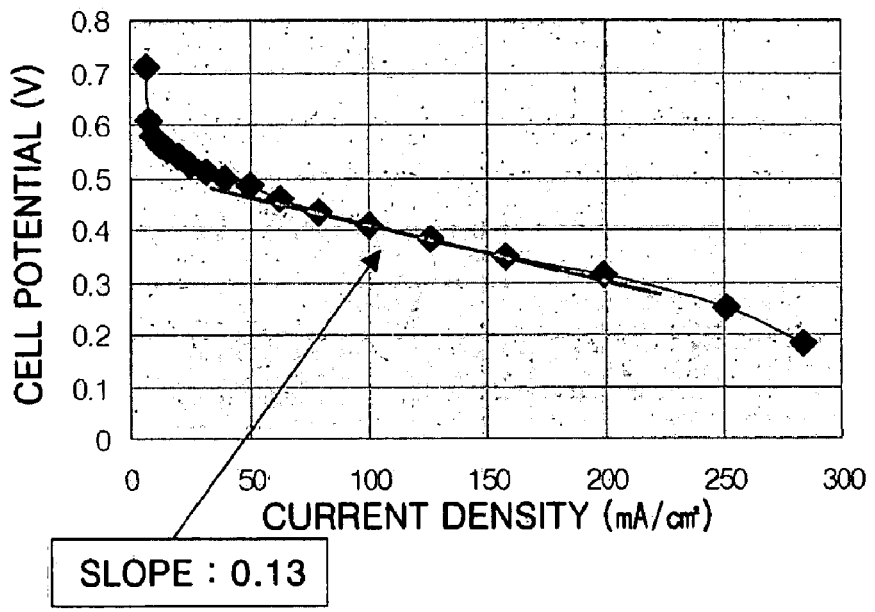
FIGS. 3A through 3D are graphs of cell potential versus current density of the MEAs according to Example 1 (FIG. 3A), Example 2 (FIG. 3B), Example 3 (FIG. 3C) and Comparative Example 1 (FIG. 3D)
Figure 3B:
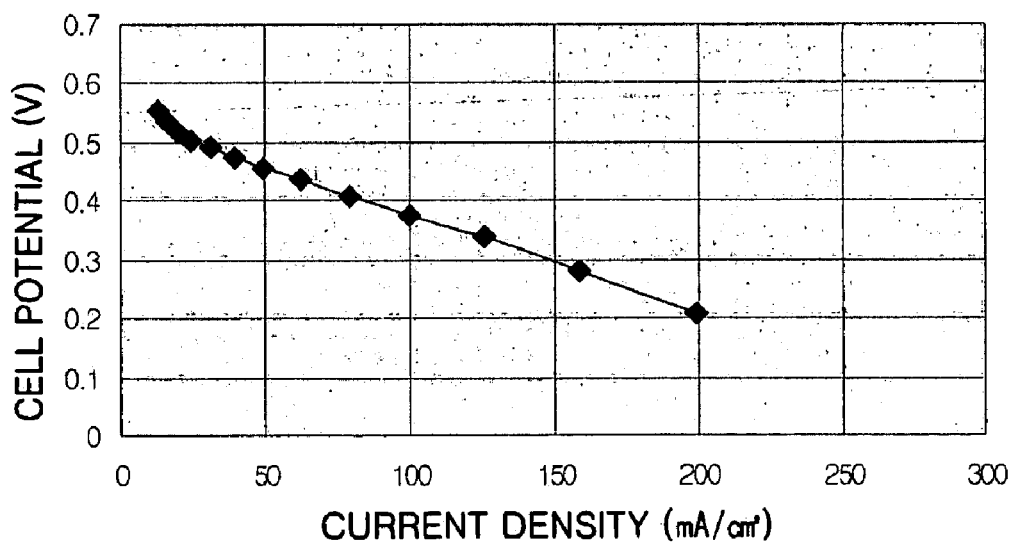
Figure 3C:
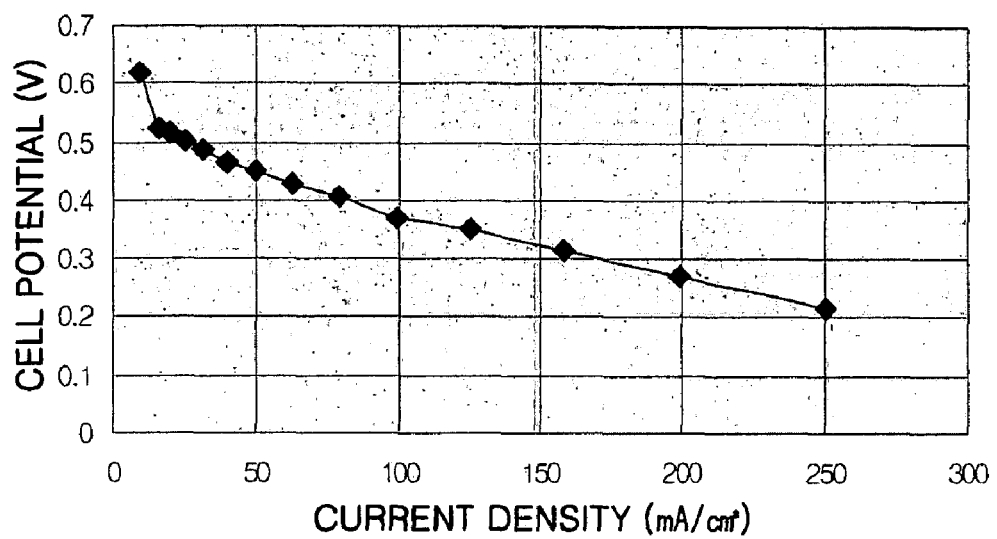
Figure 3D:
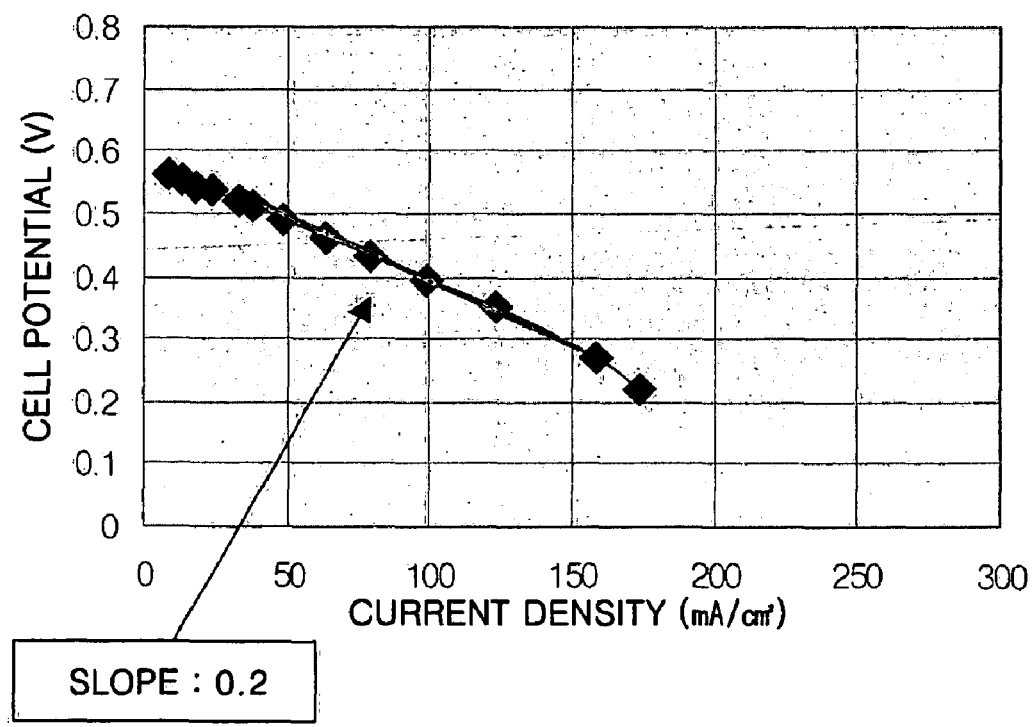

The performances of the MEAs according to Example 1 and Comparative Example 1 were compared using polarization curves, as shown in FIGS. 3A and 3D. Referring to FIGS. 3A and 3D, the slope of the polarization curve of Example 1 (FIG. 3A) was smaller than the slope of the polarization curve of Comparative Example 1 (FIG. 3D). The decrease in slope is attributed to the silica in the catalyst layer and the electrolyte membrane, which retains water sufficient for the reaction and lowers the interface resistance between the catalyst layer and the electrolyte or the internal resistance of the electrolyte membrane. In addition, the performance of the MEA according to Example 1 was the same as or similar to the performance of the MEA according to Comparative Example 1, which indicates that the silica layer does not lower the conductivity and does not interfere with the performance of the MEA.

Figure 4A:
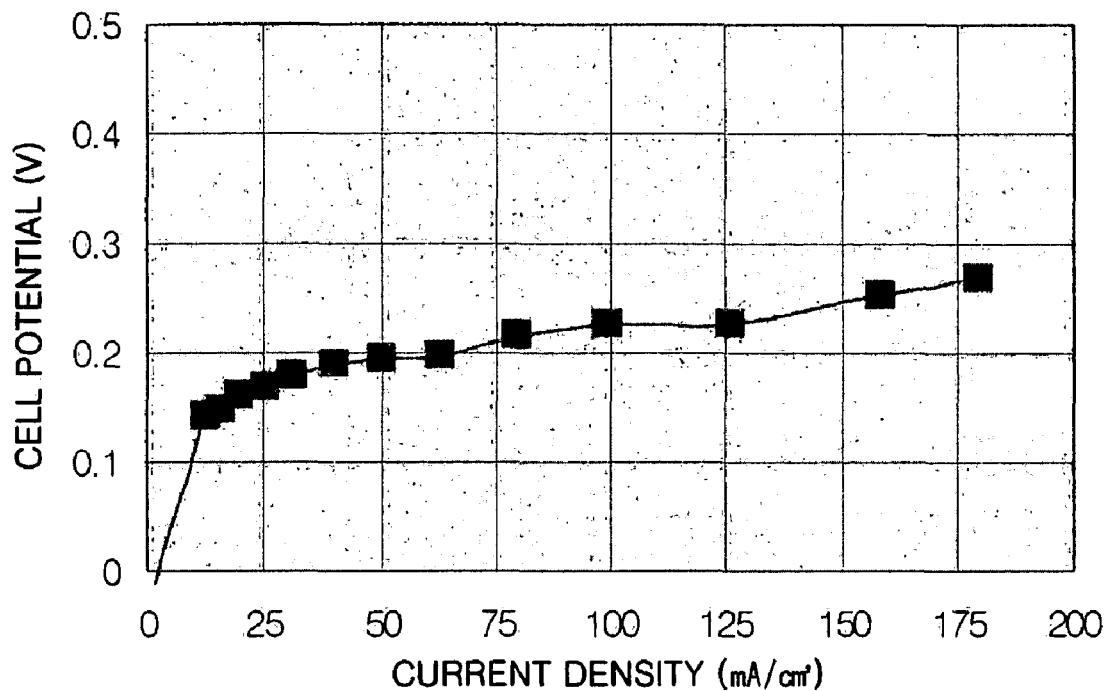
FIG. 4A is a polarization curve of an anode of the MEA according to Example 1.
Figure 4B:
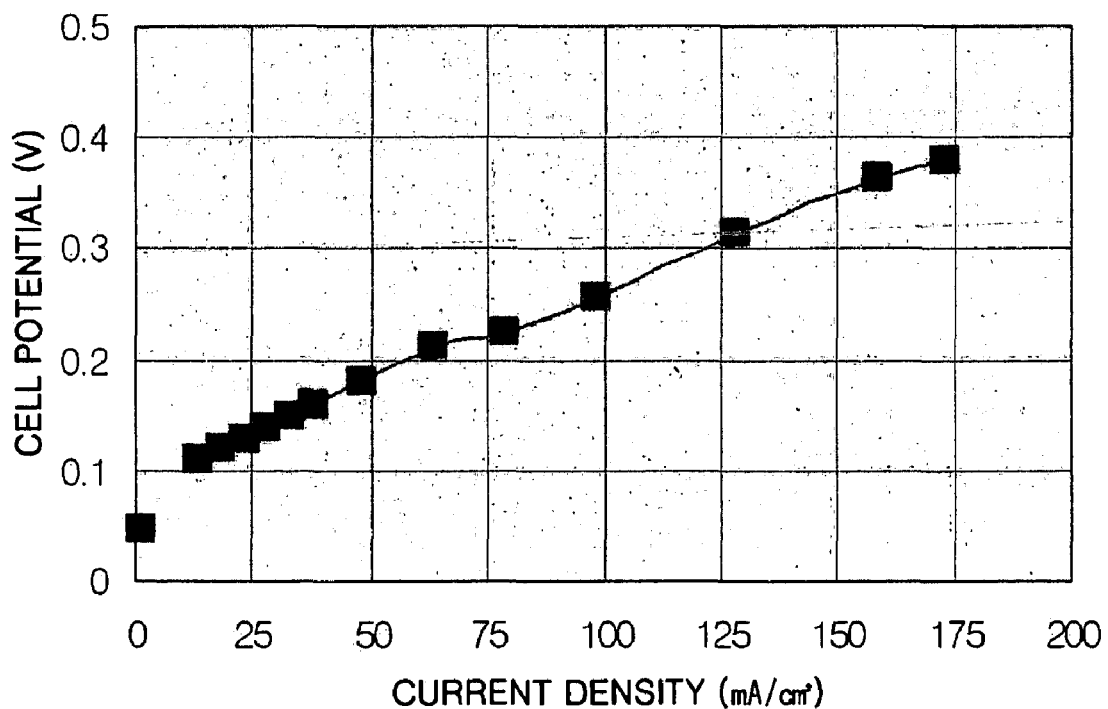
FIG. 4B is a polarization curve of an anode of the MEA according to Comparative Example 1.

FIG. 4A is a polarization curve of an anode electrode of the MEA according to Example 1, and FIG. 4B is a polarization curve of an anode electrode of the MEA according to Comparative Example 1. Referring to FIGS. 4A and 4B, the performance of the MEA according to Example 1 is poorer than the MEA according to Comparative Example 1 at an initial stage. However, the performance of the MEA according to Example 1 is stabilized in a high current density region, indicating that silica can reduce the crossover of methanol.

As described above, in a fuel cell according to aspects of the present invention, the performance of the fuel cell is stably maintained even when fuel is not smoothly supplied for a while due, for example, to a malfunction of a pump or clogging of a fuel channel. In addition, the moisture retentive material binds water that is generated at a cathode electrode and moves to the anode electrode by back diffusion, thereby preventing flooding in the anode catalyst layer.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell comprising:
   a cathode;
   an anode;
   an electrolyte membrane layer interposed between the cathode and the anode, the electrolyte membrane layer consisting essentially of a cation exchange polymer electrolyte; and
   a porous layer consisting of a moisture retentive material,
   wherein the anode comprises an anode catalyst layer adjacent to the electrolyte membrane layer and an anode diffusion layer adjacent to the anode catalyst layer, wherein the porous layer is disposed between and contacts the anode catalyst layer and the electrolyte membrane layer, and wherein the thickness of the porous layer is in the range of 0.5-5 μ.

2. The fuel cell of claim 1, wherein the moisture retentive material is at least one compound selected from the group consisting of $SiO_2$, $TiO_2$, $ZrO_2$, mordenite, and zeolite.

3. The fuel cell of claim 1, wherein the porous layer is either a continuously coated layer or a discontinuously coated layer.

4. The fuel cell of claim 1, wherein the moisture retentive material has an average particle diameter in the range of $50\text{-}10^4$ nm.

* * * * *